United States Patent
Oyanagi et al.

(10) Patent No.: US 7,604,693 B2
(45) Date of Patent: Oct. 20, 2009

(54) INK SET, INK CONTAINER, LIQUID EJECTING APPARATUS, INK-JET RECORDING PROCESS, AND RECORDED ARTICLE

(75) Inventors: Takashi Oyanagi, Shiojiri (JP); Kiyohiko Takemoto, Matsumoto (JP); Kazuhiko Kitamura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/011,834

(22) Filed: Jan. 29, 2008

(65) Prior Publication Data

US 2008/0182083 A1    Jul. 31, 2008

(30) Foreign Application Priority Data

| Jan. 29, 2007 | (JP) | ............................. 2007-017273 |
| Jan. 29, 2007 | (JP) | ............................. 2007-017275 |
| Nov. 26, 2007 | (JP) | ............................. 2007-304874 |

(51) Int. Cl.
*C09D 11/02* (2006.01)
*B41J 2/01* (2006.01)

(52) U.S. Cl. ............... 106/31.6; 106/31.65; 106/31.69; 106/31.86; 106/31.89; 347/100

(58) Field of Classification Search ............... 106/31.6, 106/31.65, 31.86, 31.69, 31.89; 347/100
See application file for complete search history.

(56) References Cited

U.S. PATENT DOCUMENTS

| 7,156,909 | B2 * | 1/2007 | Oyanagi et al. | ........... 106/31.86 |
| 7,303,619 | B2 * | 12/2007 | Oyanagi | .................... 106/31.6 |
| 2005/0039631 | A1 * | 2/2005 | Best et al. | .................. 106/31.6 |
| 2007/0044684 | A1 * | 3/2007 | Nakano et al. | ........... 106/31.86 |
| 2007/0060670 | A1 * | 3/2007 | Ellis | ............................ 523/160 |
| 2008/0096998 | A1 * | 4/2008 | Oyanagi et al. | ................ 522/49 |
| 2008/0145628 | A1 * | 6/2008 | Oyanagi et al. | ............. 428/206 |
| 2008/0182085 | A1 * | 7/2008 | Oyanagi et al. | ........... 428/195.1 |
| 2008/0213518 | A1 * | 9/2008 | Oyanagi et al. | ............. 106/31.6 |
| 2008/0250970 | A1 * | 10/2008 | Oyanagi et al. | .......... 106/31.65 |

FOREIGN PATENT DOCUMENTS

| JP | 2002-179960 | 6/2002 |
| JP | 2003-292836 | 10/2003 |
| JP | 2003-306625 | 10/2003 |

* cited by examiner

*Primary Examiner*—Helene Klemanski
(74) *Attorney, Agent, or Firm*—Nutter McClennen & Fish LLP; John J. Penny, Jr.

(57) ABSTRACT

An ink set includes an oil ink composition containing a metal pigment; and at least one aqueous ink composition selected from the group consisting of a chromatic ink composition containing a chromatic pigment, a black ink composition containing a black pigment, and a white ink composition containing a white pigment.

22 Claims, No Drawings

INK SET, INK CONTAINER, LIQUID EJECTING APPARATUS, INK-JET RECORDING PROCESS, AND RECORDED ARTICLE

BACKGROUND

1. Technical Field

The present invention relates to an ink set, an ink container, a liquid ejecting apparatus, an ink-jet recording process, and a recorded article. More, specifically, the invention relates to an ink set that can form a film having metallic gloss, an ink container containing the ink set, a liquid ejecting apparatus provided with the ink container, an ink-jet recording process using the ink set, and a recorded article recorded by the ink-jet recording process.

2. Related Art

In order to form a film having metallic gloss on a printing material, a gold-colored powder or silver-colored powder that is formed from brass or aluminum fine particles has been used as a pigment of a printing ink, or hot stamping using a metal foil or thermal transfer printing using a metal foil has been employed.

However, since the gold-colored powder or the silver-colored powder used has a large average particle diameter of 10 to 30 µm, the film of a printing ink containing such a metal powder is difficult to have specular gloss though it can have frosted metallic gloss. In the hot stamping or thermal transfer printing that uses a metal foil, an adhesion is applied to a recording medium, and then a smooth metal foil is pressed onto the adhesion. The recording medium and the metal foil being in adhered to each other are heated to be thermally fused. Consequently, though relatively high gloss can be achieved, the number of printing processes is increased. In addition, since a pressure and heat are applied to the recording medium during the printing processes, the recording medium is limited to one having sufficient resistivity to heat and deformation.

Recently, ink jet is frequently applied to printing. One of such applications is metallic printing. For example, JP-A-2002-179960 discloses an ink-jet printing technique using an ink composition containing a pigment prepared by forming a metal coating on the surfaces of spherical plastic particles. However, the particles are required to be deformed into an oblate shape and to have a smooth surface in order to obtain high metallic gloss. Therefore, in this technique, it is required to simultaneously conduct pressing with a roller and heating, and consequently a complicated apparatus and manufacturing process is unavoidable. Furthermore, recording media that can be used are limited.

Furthermore, JP-A-2003-292836 and JP-A-2003-306625 disclose a technique using an ink composition in which a colloid of a noble metal such as gold or silver is dispersed. However, the noble metal colloid develops a color caused by plasmon absorption when the particle diameter is reduced to several to several tens nanometers for providing a priority in the dispersion stability. Consequently, the ink composition cannot achieve metallic gloss. In such a case, in order to obtain high metallic gloss, a film formed by using the ink composition is dried and then heated so that the colloidal particles are fused. However, in these techniques, even if metallic gloss can be obtained, it is difficult to obtain a uniform surface with high metallic specular gloss, such 20-degree, 60-degree, and 85-degree specular glosses exceeding 200, 200, and 100, respectively. Alternatively, in a case that the particle diameter is increased for providing a priority in the metallic gloss, the dispersion stability is decreased to disadvantageously cause aggregation and precipitation. Accordingly, the storage life of the ink composition is significantly decreased. Furthermore, it is obvious that the use of a noble metal material significantly increases the cost of the ink composition, and therefore the ink composition can be used in a high-value-added purpose only and is thus disadvantageous.

Furthermore, there is known a method using a metallic ink composition prepared by mixing a metal pigment and a coloring material as a single ink composition. In this method, there are problems such that the metal pigment and the coloring material are separated during printing and that only the metal pigment is precipitated and aggregated during storage of the ink composition. When this ink composition is used for printing, only the coloring material is absorbed by a recording medium and the metal pigment alone remains at the surface to cause failed printing such as ununiform image formation with decoloration or irregular color.

SUMMARY

An advantage of some aspects of the invention is to provide an ink set that can form a film having metallic gloss on a printing material by constituting the ink set so as to contain an ink composition having high metallic specular gloss by using aluminum as a relatively inexpensive metal material.

The present inventors have conducted intensive studies and have found the fact that a printed material having high specular gloss, which has not been achieved before, can be obtained by a metal pigment dispersion prepared by using a specific metal pigment. The invention has been completed based on this finding and also provides an ink composition containing the dispersion, an ink-jet recording process using the ink composition, and a recorded article by the ink-jet recording process.

The invention provides an ink set including an oil ink composition containing a metal pigment and at least one aqueous ink composition selected from the group consisting of a chromatic ink composition containing a chromatic pigment, a black ink composition containing a black pigment, and a white ink composition containing a white pigment.

The metal pigment is preferably plate-like particles having a plane with a major axis X, a minor axis Y, and a thickness Z satisfying conditions that the 50% average particle diameter R50 of circle equivalent diameters calculated from the X-Y plane areas of the plate-like particles is 0.5 to 3 µm, and the R50/Z is larger than 5. For example, the metal pigment is made of aluminum or an aluminum alloy.

The oil ink composition preferably includes a metal pigment, an organic solvent, and a resin. For example, the oil ink composition includes 0.1% to 3.0% by weight of the metal pigment. The organic solvent preferably contains at least one type of alkylene glycol ether that is a liquid under normal temperature and normal pressure, and is more preferably a mixture of alkylene glycol diether, alkylene glycol monoether, and lactone. The resin is preferably at least one selected from the group consisting of polyvinyl butyral, cellulose acetate butyrate, and polyacrylic polyol.

The chromatic ink composition, the black ink composition, and the white ink composition each preferably contain at least a water-insoluble pigment, water, a water-soluble organic solvent, and a surfactant. The water-soluble organic solvent is preferably at least one selected from the group consisting of alkylene glycol, alkylene glycol ether, alkanol, alkane diol, glycerin, polyalkylene glycol, and lactone. The surfactant is preferably at least one selected from the group consisting of acetylene diol surfactants, polyether modified silicone surfactants, and polyester modified silicone surfactants.

The chromatic ink composition preferably includes a yellow ink composition containing at least one selected from the group consisting of C.I. Pigment Yellow 74, 93, 110, 120, 128, 129, 138, 150, 151, 155, 180, and 213; a magenta ink composition containing C.I. Pigment Red 122 and/or C.I. Pigment Violet 19; and a cyan ink composition containing at least one selected from the group consisting of C.I. Pigment Blue 15:3, 15:4, and 60. The black ink composition preferably includes a black ink composition containing C.I. Pigment Black 7. The white ink composition preferably includes a white ink composition containing C.I. Pigment White 6 and/or a hollow white pigment emulsion. In this case, the chromatic ink composition more preferably includes the yellow ink composition, the magenta ink composition, the cyan ink composition, and at least one composition selected from the group consisting of a red ink composition containing C.I. Pigment Red 117, a green ink composition containing C.I. Pigment Green 7, and an orange ink composition containing C.I. Pigment Orange 43 and/or 242. More preferably, the chromatic ink composition further includes at least one selected from the group consisting of a light yellow ink composition containing the same type of pigment as that of the above yellow ink composition, a light magenta ink composition containing the same type of pigment as that of the above magenta ink composition, and a light cyan ink composition containing the same type of pigment as that of the above cyan ink composition.

The invention provides an ink-jet recording process using the above-mentioned ink set for recording an image by ejecting a droplet of an ink composition and depositing the droplet onto a recording medium.

In the ink-jet recording process, an image is preferably formed by simultaneously ejecting the oil ink composition and at least one selected from the group consisting of the chromatic ink composition, the black ink composition, and the white ink composition. It is also preferable that an image be first formed by using the oil ink composition and then an arbitrary color tone be formed by using the chromatic ink composition. For example, printing is performed by heating a recording medium. The heating may be conducted before the printing and/or simultaneously with the printing and/or after the printing.

The invention provides a recorded article recorded by the above-mentioned ink-jet recording process. Furthermore, the invention provides an ink container containing the above-mentioned ink set. In addition, the invention provides a liquid ejecting apparatus provided with the ink container.

In the ink set, the ink container, the liquid ejecting apparatus, the ink-jet recording process, and the recorded article according to the invention, an image having high metallic specular gloss (so-called metallic gloss) can be formed on a recording medium by using an ink composition containing a metal pigment. Furthermore, an image having a metallic gloss with an arbitrary color tone, which has not been achieved by known ink sets, can be formed by constituting the ink set as a combination of the chromatic ink composition, the black ink composition, and the white ink composition.

DESCRIPTION OF EXEMPLARY EMBODIMENTS

Ink Set

First Embodiment

An ink set according to a first embodiment of the invention includes an oil ink composition containing a metal pigment and at least one aqueous ink composition selected from the group consisting of a chromatic ink composition containing a chromatic pigment, a black ink composition containing a black pigment, and a white ink composition containing a white pigment, as described above. With this, a metallic image imparted with a color tone of the chromatic pigment, the black pigment, and the white pigment can be formed.

The metal pigment (or referred to as "metallic pigment") is preferably plate-like particles having a plane with a major axis X, a minor axis Y, and a thickness Z satisfying conditions that the 50% average particle diameter R50 of circle equivalent diameters calculated from the X-Y plane areas of the plate-like particles is 0.5 to 3 μm, and the R50/Z is larger than 5.

The term "plate-like particle" means a particle having an approximately plane face (X-Y plane) and an approximately uniform thickness (Z). The plate-like particles are formed by pulverizing a metal vapor deposition film. Accordingly, metal particles can have an approximately plane face and an approximately uniform thickness. Therefore, the major axis and the minor axis of the plane and the thickness of the plate-like particle can be defined to X, Y, and Z, respectively.

The term "circle equivalent diameter" means the diameter of a circle having the same projected area as that of the approximately plane face (X-Y plane) of a plate-like metallic pigment particle. For example, when the approximately plane face (X-Y plane) of a plate-like metallic pigment particle is a polygon, the projected face (X-Y plane) of the polygon is converted into a circle, and the diameter of the circle is defined as the circle equivalent diameter of the plate-like metallic pigment particle.

The 50% average particle diameter R50 of circle equivalent diameters calculated from the X-Y plane areas of the plate-like particles is preferably 0.5 to 3 μm and further preferably 0.75 to 2 μm, from the viewpoints of metallic gloss and printing stability.

Furthermore, in the relationship between the 50% average particle diameter R50 of circle equivalent diameters and the thicknesses Z, the R50/Z is preferably larger than 5, from the viewpoint of achieving high metallic gloss.

The metallic pigment is preferably made of aluminum or an aluminum alloy from the viewpoint of cost-efficiency and the viewpoint of achieving high metallic gloss. In a case of an aluminum alloy, an element to be added to aluminum may be any metal element or non-metal element that has metallic gloss, and examples thereof include silver, gold, platinum, nickel, chromium, tin, zinc, indium, titanium, and copper. These elements may be used alone or as an alloy or a mixture thereof.

The metallic pigment can be prepared, for example, by forming a complex pigment raw material having a structure including a resin layer for peeling-off and a metal or metal compound layer sequentially stacked on a sheet-like substrate, peeling off the metal or metal compound layer from the sheet-like substrate at the interface with the resin layer for peeling-off as a boundary, and pulverizing the metal or metal compound layer into plate-like fine particles. Then, among the obtained plate-like particles, particles having a plane with a major axis X, a minor axis Y, and a thickness Z satisfying conditions that the 50% average particle diameter R50 of circle equivalent diameters calculated from the X-Y plane areas of the plate-like particles is 0.5 to 3 µm, and the R50/Z is larger than 5 are collected.

The major axis X, the minor axis Y, and the circle equivalent diameter of the plane of a metallic pigment (plate-like particle) can be measured using a particle image analyzer, such as a flow particle image analyzer, model FPIA-2100, FPIA-3000 or FPIA-3000S, manufactured by Sysmex Corporation.

The metal or metal compound layer is preferably formed by vacuum deposition, ion plating, or sputtering.

The metal or metal compound layer has a thickness of 20 nm or more and 100 nm or less. With such a thickness, a pigment having an average thickness of 20 nm or more and 100 nm or less can be obtained. A pigment having a thickness of 20 nm or more is excellent in reflectivity and brightness and achieves increased performance as a metallic pigment. A pigment having a thickness of 100 nm or less can prevent an increase in apparent gravity and can ensure dispersion stability of the metallic pigment.

The resin layer for peeling-off of the complex pigment raw material is an undercoat layer of the metal or metal compound layer and functions as a peeling-off layer for improving the release property of the metal or metal compound layer from the sheet-like substrate. Preferable examples of the resin used as the resin layer for peeling-off include polyvinyl alcohol, polyvinyl butyral, polyethylene glycol, polyacrylic acid, polyacrylamide, cellulose derivatives, acrylic acid polymers, and modified nylon resins.

A solution containing a mixture of the above-mentioned one or more is applied onto a sheet-like substrate and is dried to form a layer. After the application, an additive such as a viscosity-controlling agent is allowed to be contained.

The application of the resin layer for peeling-off can be conducted by a common method such as gravure coating, roll coating, blade coating, extrusion coating, dip coating, or spin coating. After the coating and drying, the surface is smoothed by calendering treatment, if necessary.

The thickness of the resin layer for peeling-off is not particularly limited and is preferably 0.5 to 50 µm and more preferably 1 to 10 µm. A resin layer with a thickness less than 0.5 µm provides an insufficient amount as a dispersed resin. A resin layer with a thickness exceeding 50 µm is readily peeled off at the interface with the pigment layer, when rolled.

The sheet-like substrate is not particularly limited and can be a releasing film. Examples of the substrate include a polyester film, such as polytetrafluoroethylene, polyethylene, polypropylene, or polyethylene terephthalate; a polyamide film, such as Nylon 66 and Nylon 6; a polycarbonate film; a triacetate film; and a polyimide film. Polyethylene terephthalate and its copolymer are preferred as materials for the sheet-like substrate.

The thickness of the sheet-like substrate is not particularly limited and is preferably 10 to 150 µm. A sheet-like substrate with a thickness of 10 µm or more has no problems in workability for processing. A sheet-like substrate with a thickness of 150 µm or less is excellent in flexibility and has no problems in rolling and peeling-off.

The metal or metal compound layer may be interposed between protection layers. Examples of the protection layer include a silicon oxide layer and a resin layer for protection.

Any layer containing silicon oxide can be used as the silicon oxide layer without particular limitation. The silicon oxide layer is preferably formed of silicon alkoxide such as tetraalkoxysilane or its polymer by a sol-gel method.

The silicon oxide layer is formed by forming a film of an alcohol solution dissolving the above silicon alkoxide or its polymer and heating the film for sintering.

Any resin that is not dissolved in a dispersion medium can be used for the protection resin layer, without any limitation. Examples of the resin include polyvinyl alcohol, polyethylene glycol, polyacrylic acid, polyacrylamide, and cellulose derivatives. Polyvinyl alcohol and cellulose derivatives are preferred.

The layer is formed by an application of an aqueous solution containing the above-mentioned one or more resins and drying it. The solution may contain an additive such as a viscosity-controlling agent.

The application of the above silicon oxide and the resin is conducted by a method similar to the application of the resin layer for peeling-off.

The thickness of the protection layer is not particularly limited and is preferably in the range of 50 to 150 nm. A protection layer with a thickness less than 50 nm has insufficient mechanical strength. A protection layer with a thickness exceeding 150 nm has strength being too high to be pulverized and dispersed and may be peeled off at the interface with the metal or metal compound layer.

In addition, a color material layer may be interposed between the "protection layer" and the "metal or metal compound layer".

The color material layer is introduced for obtaining a complex pigment with an arbitrary color. The color material layer is not particularly limited as long as it can contain a color material that can impart an arbitrary color tone or hue to the metallic pigment used in the invention in addition to the metallic gloss and brightness. The color material used in this color material layer may be either a dye or a pigment, and known dyes and pigments can be arbitrarily used.

The term "pigment" used in the color material layer means those generally defined in the field of pigment chemistry, such as natural pigments, synthetic organic pigments, and synthetic inorganic pigments. Therefore, the pigment of the color material layer is different from those used in a lamination structure such as the "complex pigment" of the invention.

The color material layer may be formed by any method without particular limitation and is preferably formed by coating.

In a case that the color material of the color material layer is a pigment, it is preferable that the layer further contain a color material-dispersing resin. The color material-dispersing resin is preferably formed into a thin resin film by dispersing or dissolving the pigment, the color material-dispersing resin, and other necessary additives in a solvent, forming a uniform liquid film of the solution by spin coating, and drying it.

Both the above-mentioned color material layer and the protection layer are preferably formed by coating, from the viewpoint of productivity of the complex pigment raw material.

The complex pigment raw material may have a lamination structure including a plurality of alternately stacked layers of the resin layer for peeling-off and the metal or alloy layer. The total thickness of the lamination structure including a plurality of metal or alloy layers, for example, the thickness of lamination structure composed of (metal or alloy layer)—(resin layer for peeling-off)—(metal or alloy layer) excepting the sheet-like substrate and the resin layer for peeling-off lying directly on the sheet-like substrate, or the thickness of the (resin layer for peeling-off)—(metal or alloy layer) is preferably 5000 nm or less. A complex pigment raw material with a thickness of 5000 nm or less scarcely has cracking and peeling when rolled and thus has excellent storage stability. In addition, such a complex pigment raw material can be processed into a pigment that can exhibit excellent brightness.

Both faces of the sheet-like substrate may be provided with the resin layer for peeling-off and the metal or alloy layer, but the structure is not limited thereto.

The metal or alloy layer may be peeled off from the sheet-like substrate by any method without particular limitation and is preferably peeled off by immersing the complex pigment raw material in a liquid. In addition, the complex pigment raw material may be immersed in a liquid under ultrasonic wave treatment for pulverizing the peeled complex pigment.

Since the resin layer for peeling-off functions as protective colloid for the thus obtained pigment, a stable dispersion can be obtained by only dispersing the pigment in a solvent. In an ink composition using the above pigment, the resin of the resin layer for peeling-off also improves adhesion of the ink to a recording medium such as paper.

The oil ink composition used in the ink set according to this embodiment contains the above-described metallic pigment, an organic solvent, and a resin.

The metallic pigment concentration in the oil ink composition is preferably 0.1% to 3.0% by weight.

In a case that the metallic pigment concentration in the ink composition is 0.1% by weight or more and less than 1.5% by weight, it is possible to print an image having a half mirror-like gloss face, namely, a glossy and translucent face, by ejecting the ink in an amount that is insufficient for covering the printing face, and it is possible to print an image having a face with high metallic gloss by ejecting an ink in an amount that is sufficient for covering the printing face. Therefore, such a concentration is suitable, for example, for forming a half-mirror image on a transparent recording medium or for expressing a high metallic gloss face. In a case that the metallic pigment concentration in the ink composition is 1.5% by weight or more and 1.5% by weight or less, the metal pigment is randomly arranged on a printing face, and hence high gloss cannot be achieved and a mat metallic face can be formed. Therefore, such a concentration is suitable, for example, for forming a shielding layer on a transparent recording medium.

The organic solvent is preferably a polar organic solvent. Examples of the polar organic solvent include alcohols (for example, methyl alcohol, ethyl alcohol, propyl alcohol, butyl alcohol, isopropyl alcohol, and fluoroalcohol), ketones (for example, acetone, methyl ethyl ketone, and cyclohexanone), carboxylic acid esters (for example, methyl acetate, ethyl acetate, propyl acetate, butyl acetate, methyl propionate, and ethyl propionate), and ethers (for example, diethyl ether, dipropyl ether, tetrahydrofuran, and dioxane).

In particular, the organic solvent preferably contains at least one alkylene glycol ether that is a liquid under normal temperature and normal pressure.

The alkylene glycol ether is ethylene glycol ether or propylene glycol ether that includes an aliphatic group (methyl, n-propyl, i-propyl, n-butyl, i-butyl, hexyl, or 2-ethylhexyl), an ally group having a double bond, and a phenyl group as base moieties. The alkylene glycol ether is colorless and low in odor and is a liquid at room temperature and has both characteristics of alcohol and ether because of the ether group and the hydroxyl group present in the molecule. Furthermore, the alkylene glycol ether may be monoether in which one hydroxyl group is substituted or diether in which both hydroxyl groups are substituted. These alkylene glycol ethers can be used in a combination of several types thereof.

In particular, the organic solvent is preferably a mixture of alkylene glycol diether, alkylene glycol monoether, and lactone.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, and dipropylene glycol monoethyl ether.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether.

Examples of the lactone include γ-butyrolactone, δ-valerolactone, and ε-caprolactone.

With such a suitable constitution, the object of the invention can be further achieved.

Examples of the resin used in the oil ink composition include acrylic resins, styrene-acrylic resins, rosin modified resins, terpene-based resins, polyester resins, polyamide resins, epoxy resins, vinyl chloride resins, vinyl chloride-vinyl acetate copolymers, cellulose-based resins (for example, cellulose acetate butyrate and hydroxypropyl cellulose), polyvinyl butyral, polyacrylic polyol, polyvinyl alcohol, and polyurethane.

In addition, a non-aqueous dispersion (NAD) of polymer fine particles can be used as the resin. The NAD is a dispersion in which fine particles of a polyurethane resin, an acrylic resin, or an acrylic polyol resin are stably dispersed in an organic solvent. For example, Sanpren IB-501 and Sanpren IB-F370 are dispersed polyurethane resins available from Sanyo Chemical Industries, Ltd., and N-2043-60MEX and N-2043-AF-1 are dispersed acrylic polyol resins available from Harima Chemicals, Inc.

The resin is preferably added to an ink composition in an amount of 0.1% by weight or more and 10% by weight or less for further improving the adhesion of a pigment to a recording medium.

The oil ink composition preferably contains at least one of glycerin, polyalkylene glycol, and saccharides in a total amount of preferably 0.1% by weight of more and 10% by weight or less in the ink composition.

With such a suitable constitution, the ink is prevented from being dried and clogging, the ejection of the ink is stabilized, and the image quality of a recorded article is improved.

The polyalkylene glycol is a linear high-molecular compound having a structure of repeated ether bonds in the main chain and is manufactured, for example, by ring-opening polymerization of cyclic ether.

Examples of the polyalkylene glycol include polymers such as polyethylene glycol and polypropylene glycol, ethylene oxide-propylene oxide copolymers, and derivatives thereof. Any copolymer such as a random copolymer, a block copolymer, a graft copolymer, or an alternating copolymer can be used.

Preferable examples of the polyalkylene glycol are represented by the following formula:

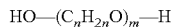

$$HO-(C_nH_{2n}O)_m-H$$

wherein n represents an integer of 1 to 5, and m represents an integer of 1 to 100.

In the $C_nH_{2n}O$ of the above formula, the integer n may represent one number or a combination of two or more numbers in the range of 1 to 5. For example, when n represents one number, 3, $(C_nH_{2n}O)_m$ is $(C_3H_6O)_m$. When n represents a combination of two numbers, 1 and 4, $(C_nH_{2n}O)_m$ is $(CH_2O-C_4H_8O)_m$. Similarly, the integer m may represent one number or a combination of two or more numbers in the range of 1 to 100. For example, in the above example, when m represents a combination of two numbers, 20 and 40, $(C_nH_{2n}O)_m$ is $(CH_2O)_{20}-(C_4H_8O)_{40}$. When m represents a combination of two numbers, 10 and 30, $(C_nH_{2n}O)_m$ is $(CH_2O)_{10}-(C_4H_8O)_{30}$. The combination of the integer n and the integer m is arbitrary in the above respective ranges.

Examples of the saccharide include monosaccharides such as pentose, hexose, heptose, and octose; polysaccharides such as disaccharide, trisaccharide, and tetrasaccharide; derivatives thereof such as sugar alcohol, reduced derivatives such as deoxy acid, oxidized derivatives such as aldonic acid and uronic acid, and dehydrated derivatives such as glycosene; amino acid; and thiosaccharides. The term "polysaccharides" means saccharides in a broad sense and includes materials that widely present in nature, such as alginic acid, dextrin, and cellulose.

The oil ink composition preferably contains at least one type of acetylene glycol surfactant and/or silicone surfactant. The amount of the surfactant is preferably 0.01% by weight or more and 10% by weight or less to the content of the pigment in the ink composition.

The above constitution enhances wettability of the oil ink composition to a recording medium to achieve quick adhesion of the ink.

Preferable examples of the acetylene glycol surfactant include Surfynol 465 (trade name) and Surfynol 104 (trade name), which are manufactured by Air Products and Chemicals, Inc. and Olfine STG (trade name) and Olfine E1010 (trade name), which are manufactured by Nissin Chemical Industry Co., Ltd.

The silicone surfactant is preferably polyester modified silicone or polyether modified silicone, and examples thereof include BYK-347, BYK-348, BYK-UV3500, BYK-UV3510, BYK-UV3530, and BYK-UV3570 (BYK Additives & Instruments).

The oil ink composition can be prepared by a known method. For example, first, the above-mentioned metallic pigment, a dispersant, and a solvent are mixed and prepared into a pigment-dispersing solution having desired ink properties with a ball mill, a bead mill, a jet mill, or an ultrasonic wave. Then, a binder resin, a solvent, and other additives (for example, a dispersion aid and a viscosity-controlling agent) are added to the resulting pigment-dispersing solution with stirring to give a pigment ink composition.

A complex pigment raw material may be once treated with an ultrasonic wave in a solvent to prepare a complex pigment dispersion, and then the dispersion may be mixed with a suitable solvent for ink. Alternatively, a complex pigment raw material may be treated with an ultrasonic wave in a solvent for ink to directly give an ink composition.

The physical properties of the oil ink composition are not particularly limited, and, for example, the surface tension is preferably 20 to 50 mN/m. An oil ink composition having a surface tension less than 20 mN/m may wet and spread over the surface of a printer head for ink jet recording or ooze out from the printer head to make it difficult to eject an ink droplet. An oil ink composition having a surface tension exceeding 50 mN/m may not wet and spread on the surface of a recording medium not to perform favorable printing.

Next, the chromatic ink composition, the block ink composition, and the white ink composition used in the ink set according to this embodiment will be described. Each of these ink compositions preferably contains at least a water-insoluble pigment, water, a water-soluble organic solvent, and a surfactant.

The chromatic ink composition is an ink composition containing a chromatic pigment. The term "chromatic" means all colors other than achromatic colors from white through gray to black. Examples of the chromatic pigment include C.I. Pigment Yellow 1 (First Yellow G), 2, 3, 12 (Dis-Azo Yellow AAA), 13, 14, 16, 17, 24, 34, 35, 37, 42 (Yellow Iron Oxide), 53, 55, 73, 74, 75, 81, 83 (Dis-Azo Yellow HR), 93, 94, 95, 97, 98, 100, 101, 104, 108, 109, 110, 117, 120, 128, 129, 138, 139, 150, 153, 154, 155, 180, 185, and 213; C.I. Pigment Red 1, 2, 3, 5, 7, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (Red Iron Oxide), 104, 105, 106, 112, 114, 122 (Quinacridone Magenta), 123, 146, 149, 166, 168, 170, 172, 177, 178, 179, 184, 185, 190, 193, 202, 209, and 219; C.I. Pigment Violet 19; C.I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 22, 56, 60, and 63; and C.I. Pigment Green 1, 4, 7, 8, 10, 17, 18, and 36.

Any pigment that is insoluble to water can be used even if it is not listed on color indices.

The content of the chromatic pigment may be optionally determined and is preferably 0.1% to 30% by weight and more preferably 0.5% to 12% by weight in an ink composition.

The black ink composition is an ink composition containing a black pigment. Examples of the black pigment include carbon blacks (C.I. Pigment Black 7) such as furnace black, lamp black, acetylene black, and channel black; metals such as copper oxide, iron oxide (C.I. Pigment Black 11), and titanium oxide; and organic pigments such as aniline black (P.I. Pigment Black 1). The carbon blacks have a relatively low specific gravity to scarcely precipitate in water and are thus preferred for ink-jet printing. The above pigments may be used alone or as a mixture of two or more thereof.

The content of the black pigment may be optionally determined and is preferably 0.1% to 30% by weight and more preferably 0.5% to 12% by weight in an ink composition.

The white ink composition is an ink composition containing a white pigment. Examples of the white pigment include oxides of group IV elements, such as titanium dioxide and zirconium dioxide, and calcium carbonate. Calcium sulfate, zinc oxide, barium sulfate, barium carbonate, silica, alumina, kaolin, clay, talc, white clay, aluminum hydroxide, magnesium carbonate, and hollow white resin emulsion are also preferred. The above pigments may be used alone or as a mixture of two or more thereof.

The primary particle diameter of the white pigment is preferably 1 µm or less from the viewpoint of whiteness.

The term "primary particle diameter" means the size of a particle formed by gathered single crystals or crystallites similar thereto. The primary particle diameter of a pigment can be determined from an electron microscopic photograph. That is, a pigment is dispersed in an organic solvent and is immobilized on a supporting film. Image data of a transmission electron microscopic photograph of the pigment is processed and calculated to give a primary particle diameter with higher confidence. Specifically, the minor axis and the major axis of each primary particle are measured, the diameter of a circle having the same area of that the primary particle is arithmetically determined as the primary particle diameter. Fifty or more pigment particles are randomly selected from a predetermined field of view, and the average primary particle diameter of the pigment particles is determined. Any method that can provide confidence equivalent to that of the above method can be used. If there is a substantial difference in the values, the value obtained by the above-described method is employed.

The content of the white pigment is preferably 1.0% by weight or more, more preferably 5.0% by weight or more, and further preferably 10% by weight or more and 20% by weight or less, from the viewpoint of whiteness.

Each ink composition used in the ink set according to this embodiment preferably contains a pigment as a coloring agent and preferably contains a dispersant for dispersing the pigment. Any dispersant that is used in this type of pigment inks can be used without particular limitation. Examples of the dispersant include cationic dispersants, anionic dispersants, nonionic dispersants, and surfactants.

Examples of the anionic dispersants include polyacrylic acid, polymethacrylic acid, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methylstyrene-acrylic acid copolymers, styrene-α-methylstyrene-acrylic acid-acrylic acid alkyl ester copolymers, styrene-maleic acid copolymers, vinylnaphthalene-maleic acid copolymers, vinyl acetate-ethylene copolymers, vinyl acetate-fatty acid vinyl ethylene copolymers, vinyl acetate-maleic acid ester copolymers, vinyl acetate-crotonic acid copolymers, and vinyl acetate-acrylic acid copolymers.

Examples of the nonionic dispersants include polyvinylpyrrolidone, polypropylene glycol, and vinylpyrrolidone-vinyl acetate copolymers.

Examples of the surfactant as a dispersant include anionic surfactants such as sodium dodecylbenzenesulfonate, sodium laurate, and an ammonium salt of polyoxyethylene alkylether sulfate; and nonionic surfactants such as polyoxyethylene alkyl ether, polyoxyethylene alkyl ester, polyoxyethylene sorbitan fatty acid ester, polyoxyethylene alkyl phenyl ether, polyoxyethylene alkylamine, and polyoxyethylene alkyl amide. In particular, styrene-(meth)acrylic acid copolymers are preferred from the viewpoint of enhancing dispersion stability of pigments.

The chromatic ink composition, the black ink composition, and the white ink composition used in the ink set according to this embodiment preferably contain water as the balance. The water is preferably pure water or ultrapure water, such as ion-exchange water, ultrafiltration water, reverse osmosis water, and distilled water. In particular, these waters are preferably sterilized by ultraviolet ray irradiation or hydrogen peroxide addition to be prevented from occurrence of molds and bacteria over a long time.

The content of the water is preferably 50% by weight or more in the aqueous ink composition. The printing qualification (color development and permeability) of the ink onto a paper-based printing sheet can be improved by controlling the content of water to 50% by weight or more.

Each of the chromatic ink composition, the black ink composition, and the white ink composition used in the ink set according to this embodiment preferably contains a water-soluble organic solvent from the viewpoint of further improving color development (color concentration).

The water-soluble organic solvent is preferably at least one selected from the group consisting of alkylene glycol, alkylene glycol ether, alkanol, alkane diol, glycerin, polyalkylene glycol, and lactone. The use of these water-soluble organic solvent allows the surface tension of the aqueous ink composition to be controlled to a suitable range and improves the drying property of the ink. Accordingly, continuous printing and high-speed printing are possible.

The alkylene glycol is preferably 1,2-alkylene glycol. The 1,2-alkylene glycol is preferably 1,2-hexanediol or 1,2-pentanediol. These alkylene glycol may be used alone or in a combination thereof. The use of 1,2-alkylene glycol improves drying properties of printing so that a printed portion is not transferred to the reverse side of the next medium even if the printing is continuously conducted. Accordingly, high-speed printing is possible, in particular, even in ink-jet recording.

The number of carbon atoms of the alkylene glycol is preferably four to ten. Alkylene glycol having three or less carbon atoms is low in effect of enhancing permeability. Alkylene glycol having carbon atoms exceeding 15 is low in water solubility and hence requires the addition of a solubilizer to the aqueous ink composition used in this embodiment. The addition of a solubilizer increases viscosity, and the alkylene glycol is hence required to have a structure containing ethyleneoxy or a water-soluble group such as a sulfonate group or a phosphate group. Alkylene glycol having four or more carbon atoms may have a structure containing the water-soluble group. The alkylene glycol having such a structure may have 30 carbon atoms at most.

The content of alkylene glycol is preferably 15% by weight or less. In a content exceeding 15% by weight, permeability reaches the plateau and therefore further improvement in printing quality is not expected by adding further alkylene glycol. Conversely, the viscosity is increased to readily cause printing disorder.

The content of 1,2-pentanediol is preferably 3% to 15% by weight. In a content of less than 3% by weight, the effect of enhancing permeability is low. In a content exceeding 15% by weight, since 1,2-pentanediol is low in water solubility, the addition of a solubilizer to the aqueous ink used in this embodiment is required. The addition of a solubilizer increases viscosity, and 1,2-pentanediol is hence required to contain the above-mentioned water-soluble group.

The content of 1,2-hexanediol is preferably 0.5% to 10% by weight. In a content less than 0.5% by weight, the effect of enhancing permeability is low. In a content exceeding 10% by weight, since 1,2-hexanediol is low in water solubility, the addition of a solubilizer to the aqueous ink used in this embodiment is required. The addition of a solubilizer increases viscosity, and 1,2-hexanediol is hence required to contain the above-mentioned water-soluble group.

Examples of the alkanol include alkanol having four to six carbon atoms, such as 1-butanol, 1-pentanol, and 1-hexanol. The content of the alkanol is preferably 0.05% to 0.5% by weight.

The alkylene glycol ether, alkanediol, glycerin, polyalkylene glycol, and lactone may be the same as those used in the oil ink composition.

Each of the chromatic ink composition, the black ink composition, and the white ink composition used in the ink set according to this embodiment preferably contains at least one selected from the group consisting of acetylene diol surfactants, polyether modified silicone surfactants, and polyester modified silicone surfactants. The type and the content of these surfactants are similar to those of the surfactant added to the oil ink set.

Each of the ink compositions may further contain additives according to need, for example, a fixing agent such as water-soluble rosin, an antifungal and antiseptic agent such as sodium benzoate, an antioxidant and ultraviolet absorber such as alohanate, a chelating agent, an oxygen absorber, and a pH-controlling agent. One or more of these additives are used.

Examples of the pH-controlling agent include potassium hydroxide, sodium hydroxide, triethanolamine, and tripropanolamine. The content of the pH-controlling agent is determined according to a target pH.

Second Embodiment

An ink set according to a second embodiment includes an oil ink composition containing a metal pigment and at least one aqueous ink composition selected from the group consisting of a chromatic ink composition containing a chromatic pigment, a black ink composition containing a black pigment, and a white ink composition containing a white pigment. The chromatic ink composition includes a yellow ink composition containing at least one selected from the group consisting of C.I. Pigment Yellow 74, 93, 110, 120, 128, 129, 138, 150, 151, 155, 180, and 213; a magenta ink composition containing C.I. Pigment Red 122 and/or C.I. Pigment Violet 19; and a cyan ink composition containing at least one selected from the group consisting of C.I. Pigment Blue 15:3, 15:4, and 60. The black ink composition is an ink composition containing C.I. Pigment Black 7. The white ink composition is an ink composition containing C.I. Pigment White 6 and/or a hollow white pigment emulsion.

The components and preparation process of the oil ink composition containing a metal pigment are the same as those of the oil ink composition in the first embodiment, and the description thereof is hence omitted.

The chromatic ink composition, the black ink composition, and the white ink composition used in the ink set according to this embodiment will now be described. The ink set of this embodiment includes at least one aqueous ink composition selected from the group consisting of the chromatic ink composition containing a chromatic pigment, the black ink composition containing a black pigment, and the white ink composition containing a white pigment.

The chromatic ink composition used in the ink set of this embodiment includes a yellow ink composition, a magenta ink composition, and a cyan ink composition. The term "chromatic" means all colors other than achromatic colors from white through gray to black.

The yellow ink composition contains at least one pigment selected from the group consisting of C.I. Pigment Yellow 74, 93, 110, 120, 128, 129, 138, 150, 151, 155, 180, and 213.

The pigment contained in the magenta ink composition is C.I. Pigment Red 122 and/or C.I. Pigment Violet 19.

The cyan ink composition contains at least one pigment selected from the group consisting of C.I. Pigment Blue 15:3, 15:4, and 60.

The chromatic ink composition is preferably a combination of at least four ink compositions. Specifically, the chromatic ink composition is preferably a combination of a yellow ink composition, a magenta ink composition, a cyan ink composition, and an intermediate color ink composition.

Examples of the intermediate color composition include at least one selected from the group consisting of a red ink composition containing C.I. Pigment Red 117; a green ink composition containing C.I. Pigment Green 7; and an orange ink composition containing at least one or both of C.I. Pigment Orange 43 and 242.

Such a combination of the yellow, magenta, and cyan ink compositions and the intermediate color ink composition allows forming a gloss image with highly developed color and high definition.

The content of each pigment in the intermediate color ink composition is preferably 2% to 10% by weight and more preferably 2% to 6% by weight to the total weight of the ink composition, from the viewpoint of a balance between printing concentration and confidence as an ink for ink jet recording.

The chromatic ink composition preferably further includes a light ink composition so as to be a combination of at least five types of compositions. A chromatic ink composition containing a light ink composition can form a gloss image with an excellent gradation property.

The light ink composition is, for example, at least one selected from the group consisting of a light yellow ink composition containing the same type of pigment as that of the yellow ink composition, a light magenta ink composition containing the same type of pigment as that of the magenta ink composition, and a light cyan ink composition containing the same type of pigment as that of the cyan ink composition.

The content of each pigment in the light ink compositions is preferably 0.1% by weight or more and less than 2.0% by weight, more preferably 0.25% by weight or more and less than 1.5% by weight, and most preferably 0.5% by weight or more and less than 1.25% by weight, from the viewpoint of gradation properties.

The pigment contained in the black ink composition is C.I. Pigment Black 7. The content of the pigment contained in the black ink composition may be optionally determined and is preferably 0.1% to 30% by weight and more preferably 1.0% to 12% by weight in the ink composition.

The black ink composition is preferably composed of at least two types of black ink compositions containing a black pigment at different concentrations. Specifically, the black ink composition is preferably composed at least two selected from the group consisting of a mat black ink composition containing a black pigment at a concentration of 4.0% by weight of more, a black ink composition containing a black pigment at a concentration of 2.0% by weight or more and less than 4.0% by weight, a gray composition containing a black pigment at a concentration of 0.5% by weight or more and less than 2.0% by weight, and a light black ink composition containing a black pigment at a concentration less than 0.5% by weight.

The black ink composition thus including a plurality of black ink compositions containing a black pigment at different concentrations can form a monochrome image with high quality. Furthermore, the gradation property at a low lightness portion is improved to stabilize gray balance and reduce variation.

The pigment contained in the white ink composition is C.I. Pigment White 6 and/or hollow white pigment emulsion and is preferably either C.I. Pigment White 6 or hollow white pigment emulsion. The term "hollow white pigment emulsion" means emulsion containing a white pigment for aqueous ink, which is disclosed in JP-A-2006-274214. The emulsion contains a pigment composed of a core particle that is made of a material having a specific gravity lower than that of titanium oxide and a titanium oxide layer covering the surface of the core particle and having a particle diameter of 0.05 to 5 μm.

The content of a pigment contained in the white ink composition is preferably 1.0% by weight or more, more preferably 5.0% by weight or more, and most preferably 10% by weight or more and 20% by weight or less, from the viewpoint of whiteness.

Each of the above-mentioned chromatic ink composition, the black ink composition, and the white ink composition preferably contains at least a water-insoluble pigment, water, a water-soluble organic solvent, and a surfactant. Types and contents of water, the water-soluble organic solvent, and the solvent are the same as those in the first embodiment.

The aqueous ink composition used in the ink set according to this embodiment uses a pigment as the coloring agent and hence preferably contains a dispersant for dispersing the pigment. Any dispersant that is used in this type of pigment inks can be used without particular limitation, and examples thereof include cationic dispersants, anionic dispersants, non-ionic dispersants, and surfactants that are described in the first embodiment.

Each of the ink compositions may further contain additives according to need, for example, a fixing agent such as water-soluble rosin, an antifungal and antiseptic agent such as sodium benzoate, an antioxidant and ultraviolet absorber such as alohanate, a chelating agent, an oxygen absorber, and a pH-controlling agent. One or more of these additives are used. The pH-controlling agent used is similar type of that in the first embodiment.

The above-described ink set is put into an ink container, and this ink container is mounted on a liquid ejecting apparatus having an ink-jet head. Consequently, the configuration of the ink container containing the above-described ink set is included in the invention. Furthermore, the configuration of the liquid ejecting apparatus provided with the ink container is included in the invention. Ink-jet recording process In the ink-jet recording process according to this embodiment, an image is formed using the above-described ink set by driving an ink-jet head to eject a droplet of an ink composition and to adhere the droplet onto a recording medium.

When the oil ink composition containing the above-mentioned metal pigment is used alone, it is possible to form an image having metallic gloss exhibiting 20-degree, 60-degree, and 85-degree specular glosses, as defined by JIS Z8741, of not less than 200, 200, and 100, respectively. Thus, an image having desired metallic gloss, from a mat image to a glossy image, can be formed by using the oil ink composition.

Specifically, in an image having 20-degree specular gloss of 200 or more and less than 400, 60-degree specular gloss of 200 or more and less than 400, and 85-degree specular gloss of 100 or more as defined by JIS Z8741, the image can have frosted (mat) metallic gloss.

In an image having 20-degree specular gloss of 400 or more and less than 600, 60-degree specular gloss of 400 or more and less than 600, and 85-degree specular gloss of 100 or more, as defined by JIS Z8741, the image can have metallic gloss so shiny as to allow the matter projected on the image to be slightly distinguished.

In an image having 20-degree specular gloss of 600 or more, 60-degree specular gloss of 600 or more, and 85-degree specular gloss of 100 or more, as defined by JIS Z8741, the image can have sharpness and so-called "specular gloss" that is metallic gloss so shiny as to allow the matter projected on the image to be clearly distinguished.

The oil ink composition containing a metal pigment can form an image by being simultaneously ejected with the aqueous ink composition including a chromatic ink composition, a black ink composition, and a white ink composition. With this, the image can have a metallic color tone in addition to the color tone of the chromatic ink composition, the black ink composition, and the white ink composition.

When the oil ink composition is ejected separately from the aqueous ink composition, for example, it is preferable that an image having metallic gloss be first formed using the oil ink composition and then an image be formed using the chromatic ink composition. The metallic pigment scarcely infiltrates into an ink-receiving layer and is adhered on a recording medium regardless of the presence or absence of an ink-receiving layer. On the other hand, the pigments contained in the aqueous ink composition (in particular, the chromatic pigment and the black pigment) readily infiltrate into an ink-receiving layer. Accordingly, the color of a pigment of the aqueous ink composition can be developed further brightly by first ejecting the oil ink composition on a recording medium to form an adhesion layer of a metallic pigment and then adhering the pigment of the aqueous ink composition on the adhesion layer.

A method of ejecting an ink composition will now be described.

A first method is an electrostatic suction system. In this system, recording is performed by continuously ejecting droplets from a nozzle by applying a high electric field between the nozzle and an accelerating electrode disposed ahead of the nozzle, and supplying a printing information signal to deflection electrodes when the droplets pass through between the deflection electrodes. Alternatively, recording is performed by ejecting droplets so as to correspond to a printing information signal, without deflecting the ink droplets.

In a second method, ink droplets are forcibly ejected by applying a pressure to an ink solution with a compact pump and mechanically vibrating a nozzle with a liquid oscillator or the like. The ejected ink droplets are charged at the same time with the ejection, and recording is performed by supplying a printing information signal to deflection electrodes when the droplets pass through between the deflection electrodes.

A third method is a system using a piezoelectric element (piezo element). In this system, a pressure and a printing information signal are simultaneously applied to an ink solution with the piezoelectric element to eject ink droplets for recording.

A fourth method is a system of rapidly expanding the volume of an ink solution by thermal energy. The ink solution is heated according to a printing information signal with a microelectrode to form a bubble of ink, and ink droplets are ejected for recording.

Any of the above systems can be used in the ink-jet recording process according to this embodiment, but an ink composition-ejecting system without heating is preferred from the viewpoint of responding to high-speed printing. That is, the above-mentioned first, second, and third methods are preferably employed.

Any recording medium can be used without particular limitation, and examples thereof include standard paper, ink-jet printing paper (mat paper and gloss paper), glass, a film of plastic such as vinyl chloride, a film in which a base material is coated with plastic or a receiving layer, a metal, and a print wiring substrate.

When a recording medium has an ink-receiving layer, printing is preferably conducted without heating the recording medium from the viewpoint of avoiding thermal damage thereof.

When a recording medium does not have an ink-receiving layer, heating of the recording medium is preferably conducted, from the viewpoints of accelerating drying and obtaining high gloss.

The heating may be performed with a heat source being in contact with a recording medium, or with a heat source not being in contact with a recording medium, for example, irradiating the recording medium with an infrared ray or a microwave (an electromagnetic wave having a maximum wavelength of approximately 2450 MHz) or blowing hot air to the recording medium.

The heating may be conducted before the printing and/or simultaneously with the printing and/or after the printing. In other words, the heating of a recording medium may be conducted before the printing, simultaneously with the printing, after the printing, or during the entire printing process. Heating temperature is determined depending on the type of a recording medium and is preferably 30° C. to 80° C. and more preferably 40° C. to 60° C.

Recorded Article

The recorded article according to this embodiment is that recorded by the above-mentioned ink-jet recording process using the prior described ink set. Since this recorded article is obtained by the above-mentioned ink-jet recording process using the prior described ink set, the recorded article can have a metallic image with an arbitrary color tone.

EXAMPLE 1

1. Oil Ink Composition (Metallic Ink Composition)

(1) Preparation of Metallic Pigment Dispersion

A resin layer-coating solution composed of 3.0% by weight of cellulose acetate butyrate (butylation ratio: 35% to 39%, manufactured by Kanto Chemical Co., Ltd.) and 97% by weight of diethylene glycol diethyl ether (manufactured by Nippon Nyukazai Co., Ltd.) was uniformly applied on a PET film having a thickness of 100 μm by a bar coating method and then dried at 60° C. for 10 minutes to form a thin-film resin layer on the PET film.

Then, a vapor deposited aluminum layer having an average thickness of 20 nm was formed on the above resin layer using a vacuum vapor deposition apparatus (model: VE-1010, manufactured by Vacuum Device Inc.).

Then, the layered product formed by the above method was processed in diethylene glycol diethyl ether with a sonicator (model: VS-150, manufactured by As One Corporation) for 12 hours as accumulated ultrasonic dispersion treatment time for simultaneous peeling, pulverization, and dispersion of the layered product to give a metallic pigment dispersion.

The prepared metallic pigment dispersion was subjected to filtration through a SUS mesh filter with a pore size of 5 μm for removing coarse particles. Then, the filtrate was put into a round-bottom flask, and the diethylene glycol diethyl ether was evaporated using a rotary evaporator to concentrate the metallic pigment dispersion. Then, the concentration of the metallic pigment was adjusted to 5% by weight to give metallic pigment dispersion 1.

Furthermore, metallic pigment dispersions 2 and 3 were prepared by changing vapor deposition conditions and/or ultrasonic dispersion time.

The 50% average particle diameter R50 of circle equivalent diameters of X-Y plane areas [{major axis (X direction)}–{minor axis (Y direction)} plane areas] and the average film thickness Z of the metallic pigments were measured using a particle size/distribution analyzer (model FPIA-3000S, manufactured by Sysmex). The R50/Z was calculated based on the R50 value and the Z value. Table 1 shows the results.

TABLE 1

| Metallic pigment dispersion | 50% average particle diameter R50 (μm) | Average film thickness Z (μm) | R50/Z |
|---|---|---|---|
| 1 | 1.43 | 0.02 | 71.5 |
| 2 | 1.13 | 0.02 | 56.5 |
| 3 | 1.40 | 0.30 | 4.7 |

(2) Preparation of Metallic Ink Composition

Metallic pigment ink compositions having the compositions shown in Table 2 were prepared using the metallic pigment dispersions prepared in above. First, additives were mixed and dissolved in a solvent to give an ink solvent. Each of the metallic pigment dispersions was added to the respective ink solvents, and the mixture was mixed and stirred under normal temperature and normal pressure for 30 minutes with a magnetic stirrer to give each metallic pigment ink composition.

In Table 2, diethylene glycol diethyl ether (DEGDEE) and tetraethylene glycol dimethyl ether (TEGDME) were those manufactured by Nippon Nyukazai Co., Ltd. Gamma-butyrolactone was that manufactured by Kanto Chemical Co., Ltd. N-2043-AF-1 (resin emulsion) and N-2043-60MEX were those manufactured by Harima Chemicals, Inc., and BYK-3500 (surfactant) was that manufactured by BYK Additives & Instruments. The unit is % by weight.

TABLE 2

| | Metallic ink composition | | | | |
|---|---|---|---|---|---|
| Ink composition | 1 | 2 | 3 | 4 | 5 |
| DEGDEE | 47.8 | 61.8 | 47.8 | 61.8 | 61.3 |
| DPGMB | 45.0 | — | 45.0 | — | — |
| γ-butyrolactone | — | 15.0 | — | 15.0 | 15.0 |
| TEGDME | — | 18.0 | — | 18.0 | 18.0 |
| N-2043-AF-1 | 6.0 | 4.0 | 6.0 | — | — |
| N-2043-60MEX | — | — | — | 4.0 | 4.0 |
| BYK-3500 | 0.2 | 0.2 | 0.2 | 0.2 | 0.2 |
| Pigment solid content | 1.0 | 1.0 | 1.0 | 1.0 | 1.5 |
| (metallic pigment dispersion) | (1) | (2) | (3) | (2) | (2) |

2. Aqueous Ink Composition (1) Preparation of Pigment Dispersion (a) Preparation of Black Pigment Dispersion Monarch 880, which is carbon black (PBk7) manufactured by Cabot Corporation USA), was used as a black pigment. After the air in a reaction container equipped with a stirrer, a thermometer, a reflux tube, and a dropping funnel was replaced with a nitrogen gas, 65 parts by weight of paracumylphenoxy ethylene glycol acrylate, 10 parts by weight of benzyl acrylate, 2 parts by weight of acrylic acid, and 0.3 parts by weight of t-dodecyl mercaptan were put into the reaction container and heated at 70° C. Separately, 150 parts by weight of paracumylphenoxy ethylene glycol acrylate, 15 parts by weight of acrylic acid, 5 parts by weight of butyl acrylate, 1 part by weight of t-dodecyl mercaptan, 20 parts by weight of methyl ethyl ketone, and 1 part by weight of azobisisovaleronitrile were put into the dropping funnel and dropwise added to the reaction container over four hours for a polymerizing reaction for forming dispersed polymer. Then, methyl ethyl ketone was added to the reaction container to adjust the concentration of the dispersed polymer in the solution to 40%.

Forty parts by weight of the above dispersed polymer solution, 30 parts by weight of Monarch 880 (manufactured by Cabot Corporation) as a carbon black, 100 parts by weight of a 0.1 mol/L of sodium hydroxide aqueous solution, and 30 parts by weight of methyl ethyl ketone were mixed and dispersed at 200 MPa with 15 passes using ultra high-pressure homogenizer (model: Altimizer HJP-25005, manufactured by Sugino Machine Limited). Then, 300 parts by weight of ion-exchange water was added thereto, followed by further stirring for 1 hour. All of methyl ethyl ketone and part of water were evaporated using a rotary evaporator, and the residue was adjusted to a pH of 9 with a 0.1 mol/L sodium hydroxide solution and then filtered through a membrane filter with a pore size of 0.3 μm to give a black pigment dispersion (dispersion 1) containing 20% of solids (dispersed polymer and carbon black).

(b) Preparation of Cyan Pigment Dispersion

A cyan pigment dispersion (dispersion 2) was prepared by the same process as that in the black pigment dispersion except that Pigment Blue 15:3 was used as a cyan pigment.

(c) Preparation of Magenta Pigment Dispersion

A magenta pigment dispersion (dispersion 3) was prepared by the same process as that in the black pigment dispersion except that Pigment Violet 19 was used as a magenta pigment.

(d) Preparation of Yellow Pigment Dispersion

A yellow pigment dispersion (dispersion 4) was prepared by the same process as that in the black pigment dispersion except that Pigment Yellow 74 was used as a yellow pigment.

(e) Preparation of White Pigment Dispersion

A titanium-containing ore was dissolved in sulfuric acid to obtain a titanium sulfate solution. This titanium sulfate solution was hydrolyzed to give hydrated titanium oxide. Then, to 100 parts by weight (as reduced to $TiO_2$) of the resultant hydrated titanium oxide were added 0.50 parts by weight of ammonium phosphate, 0.30 parts by weight of potassium sulfate, and 0.30 parts by weight of aluminum sulfate, followed by heating in a rotary muffle furnace for laboratory use till the temperature of the product reached 1020° C. The thus produced titanium dioxide fine particles were cooled to room temperature and observed by means of a transmission electron microscopic photograph to confirm that the titanium dioxide was of anatase type having an average primary particle size of 0.13 μm.

Fifteen parts by weight of the thus treated titanium dioxide fine particles as a white pigment, 5 parts by weight of polyoxyalkylene-added polyalkyleneamine (Discole N-518 manufactured by Dai-Ichi Kogyo Seiyaku Co., Ltd.) as a dispersant, and 80 parts by weight of ethylene glycol monoallyl ether were mixed and dispersed in a sand mill (manufactured by Yasukawa Seisakusyo) packed with zirconium beads (diameter: 1.0 mm) in an amount of 1.5 times that of the slurry for 2 hours, followed by removing the beads to give a 60% by weight monomer dispersion of the titanium dioxide fine particles (dispersion 5).

(2) Preparation of Aqueous Ink Composition

Aqueous ink compositions having the following compositions as a black ink composition, a cyan ink composition, a magenta ink composition, and a yellow ink composition were prepared. The unit of the values shown in Table 3 is % by weight as long as not particularly defined. The amount of each of the pigment dispersions (dispersions 1 to 4) is shown by the converted weight of the total solid content (total amount of the pigment and the dispersed polymer). The ion-exchange water as the balance in Table 3 contains 0.05% by weight of TopSide 240 (manufactured by Palm Chem Asia) for preventing decomposition of ink, 0.02% by weight of benzotriazole for preventing corrosion of ink-jet head member, and 0.04% by weight of disodium ethylenediaminetetraacetate (EDTA) for decreasing influence of metal ions in ink.

TABLE 3

| | Aqueous ink composition | | | | |
|---|---|---|---|---|---|
| Ink composition | Black | Cyan | Magenta | Yellow | White |
| Dispersion 1 | 35 | | | | |
| Dispersion 2 | | 25 | | | |
| Dispersion 3 | | | 30 | | |
| Dispersion 4 | | | | 30 | |
| Dispersion 5 | | | | | 25 |
| TEGmBE | 2 | 1 | 1 | 1 | 1 |
| 1,2-Hexanediol | 3 | 4 | 4 | 4 | 5 |
| Glycerin | 10 | 15 | 12 | 12 | 15 |
| Trimethylolpropane | 4 | 7 | 5 | 5 | — |
| Surfinol 104 | 0.15 | 0.15 | 0.15 | 0.15 | 0.15 |
| Ion-exchange water | Balance | Balance | Balance | Balance | Balance |

TEGmBE: triethylene glycol monobutyl ether
Surfinol 104: acetylene glycol surfactant manufactured by Nisshin Chemical Co., Ltd.

3. Printing Test (1) Method of Test

An ink set (Ink Set 1) composed of metallic ink composition 1 and the above aqueous ink composition (the black ink composition, the cyan ink composition, the magenta ink composition, the yellow ink composition, and the white ink composition) was constituted. The black ink composition, the cyan ink composition, the magenta ink composition, and the yellow ink composition were filled in the corresponding color lines of ink jet printer PM-4000PX (manufactured by Seiko Epson Corporation). The metallic ink composition 1 and the white ink composition were filled in a light cyan line and a light magenta line, respectively. Then, solid printing was performed on glossy photo paper having an ink-receiving layer (model number: KA450PSK, manufactured by Seiko Epson Corporation) at room temperature. The glossiness of the printed image was measured with a glossmeter (MULTI Gloss 268, manufactured by Konica Minolta). Similarly, solid printing was respectively conducted using Ink Set 2 including metallic ink composition 2, Ink Set 3 including metallic ink composition 3, Ink Set 4 including metallic ink composition 4, and Ink Set 5 including metallic ink composition 5, instead of Ink Set 1 including metallic ink composition 1.

(2) Printing Pattern

The printing patterns using the Ink Sets 1 to 5 were as follows:

(a) Printing Pattern 1

Ejecting only the metallic ink composition;

(b) Printing Pattern 2
  Ejecting the metallic ink composition and the chromatic ink composition at the same time;
(c) Printing Pattern 3
  Ejecting the metallic ink composition and then ejecting the chromatic ink composition; and
(d) Printing Pattern 4
  Ejecting the metallic ink composition and then ejecting the white ink composition.

(3) Sensory Evaluation

The obtained printed materials were sensorily evaluated based on the following evaluation criteria:
  AA: metallic gloss so shiny as to allow the matter projected on the printed material to be clearly distinguished;
  A: metallic gloss so shiny as to allow the matter projected on the printed material to be slightly distinguished;
  B: mat metallic gloss; and
  C: no metallic gloss obtained.

The results are shown in Table 4.

TABLE 4

| Printing pattern | Ink Set 1 | Ink Set 2 | Ink Set 3 | Ink Set 4 | Ink Set 5 |
|---|---|---|---|---|---|
| 1 | A | AA | B | AA | AA |
| 2 | B | A | B | A | A |
| 3 | A | AA | B | AA | AA |
| 4 | B | B | B | B | B |

As shown in Table 4, recorded articles each having an metallic image with an optional color tone could be obtained by the above-mentioned ink-jet recording process using the above-mentioned ink sets.

EXAMPLE 2

1. Oil Ink Composition (Metallic Ink Composition)

(1) Preparation of Metallic Pigment Dispersion

A resin layer-coating solution composed of 3.0% by weight of cellulose acetate butyrate (butylation ratio: 35% to 39%, manufactured by Kanto Chemical Co., Ltd.) and 97% by weight of diethylene glycol diethyl ether (manufactured by Nippon Nyukazai Co., Ltd.) was uniformly applied on a PET film having a thickness of 100 μm by a bar coating method and then dried at 60° C. for 10 minutes to form a thin-film resin layer on the PET film.

Then, a vapor deposited aluminum layer having an average thickness of 20 nm was formed on the above resin layer using a vacuum vapor deposition apparatus (model: VE-1010, manufactured by Vacuum Device Inc.).

Then, the layered product formed by the above method was processed in diethylene glycol diethyl ether with a sonicator (model: VS-150, manufactured by As One Corporation) for 12 hours as accumulated ultrasonic dispersion treatment time for simultaneous peeling, pulverization, and dispersion of the layered product to give a metallic pigment dispersion.

The prepared metallic pigment dispersion was subjected to filtration through a SUS mesh filter with a pore size of 5 μm for removing coarse particles. Then, the filtrate was put into a round-bottom flask, and the diethylene glycol diethyl ether was evaporated using a rotary evaporator to concentrate the metallic pigment dispersion. The concentration of the metallic pigment was adjusted to 5% by weight to give a metallic pigment dispersion.

The 50% average particle diameter R50 of circle equivalent diameters of X-Y plane areas [{major axis (X direction)}-{minor axis (Y direction)} plane areas] and the average film thickness Z of the metallic pigments were measured using a particle size/distribution analyzer (model FPIA-3000S, manufactured by Sysmex). Then, the R50/Z was calculated based on the R50 value and the Z value. As a result, it was confirmed that the metallic pigment in the metallic pigment dispersion had a 50% average particle diameter R50 of 1.13 μm, an average film thickness Z of 0.02 μm, and a R50/Z of 56.5.

(2) Preparation of Metallic Ink Composition

A metallic ink composition having the composition shown below was prepared using the above-prepared metallic pigment dispersion. Specifically, additives were mixed and dissolved in a solvent to give an ink solvent. The metallic pigment dispersion was added to the ink solvent, and the mixture was mixed and stirred under normal temperature and normal pressure for 30 minutes with a magnetic stirrer to give metallic ink composition 1.

Metallic pigment dispersion (pigment solid content): 1.0% by weight
  Diethylene glycol diethyl ether: 61.8% by weight
  γ-butyloractone: 15.0% by weight
  Tetraethylene glycol dimethyl ether: 18.0% by weight
  N-2043-AF-1 (resin emulsion): 4.0% by weight
  BYK-3500 (surfactant): 0.2% by weight 2. Aqueous Ink Composition (1) Preparation of Chromatic Ink Composition Cyan ink compositions, magenta ink compositions, yellow ink compositions, an orange ink composition, a red ink composition, a violet ink composition, and a green ink composition having compositions shown in Table 5 were prepared. The unit of the values shown in Table 5 is % by weight as long as not particularly defined.

TABLE 5

| Ink | Yellow | | Magenta | | Cyan | | Orange | Red | Violet | Green |
|---|---|---|---|---|---|---|---|---|---|---|
| Composition | 1 | 2 | 3 | 4 | 5 | 6 | 7 | 8 | 9 | 10 |
| PR122 | | | 2 | | | | | | | |
| PV19 | | | | 4 | | | | | | |
| PB15:3 | | | | | 1.5 | | | | | |
| PB15:4 | | | | | | 2 | | | | |
| PO43 | | | | | | | 2 | | | |
| PG7 | | | | | | | | | | 2 |
| PV23 | | | | | | | | | 2 | |
| PY74 | | 3 | | | | | | | | |
| PY128 | 3 | | | | | | | | | |

TABLE 5-continued

| Ink | Yellow | | Magenta | | Cyan | | Orange | Red | Violet | Green |
|---|---|---|---|---|---|---|---|---|---|---|
| Composition | 1 | 2 | 3 | 4 | 5 | 6 | 7 | 8 | 9 | 10 |
| PR117 | | | | | | | | 2 | | |
| Dispersant | 1 | 1 | 1 | 1 | 1 | 1 | 1 | 1 | 1 | 1 |
| Glycerin | 14 | 13 | 15 | 15 | 15 | 15 | 15 | 15 | 15 | 15 |
| Ethylene glycol | 5 | 5 | 5 | 5 | 5 | 5 | 5 | 5 | 5 | 5 |
| 2-Pyrrolidone | 2 | | 2 | 2 | 2 | | 2 | 2 | 2 | 2 |
| 1,2-Hexanediol | 5 | | 5 | 5 | 5 | | 5 | 5 | 5 | 5 |
| TEGmBE | | 5 | | | | 5 | | | | |
| TEG | | 2 | | | | 2 | | | | |
| Surfinol E1010 | 0.5 | 0.8 | 0.5 | 0.5 | 0.5 | 0.5 | 0.5 | 0.5 | 0.5 | 0.5 |
| EDTA | 0.02 | 0.02 | 0.02 | 0.02 | 0.02 | 0.02 | 0.02 | 0.02 | 0.02 | 0.02 |
| Pure water | Balance | Balance | Balance | Balance | Balance | Balance | Balance | Balance | Balance | Balance |

TEGmBE: triethylene glycol monobutyl ether
TEG: triethylene glycol
Surfinol E1010: acetylene glycol surfactant manufactured by Air Products and Chemicals, Inc.
EDTA: disodium ethylenediaminetetraacetate (2) Preparation of Black Ink Composition Black ink compositions having compositions shown in Table 6 were prepared. The unit of the values shown in Table 6 is % by weight as long as not particularly defined.

TABLE 6

| | Black | | | |
|---|---|---|---|---|
| Ink Composition | 1 | 2 | 3 | 4 |
| PB7 | 6 | 2.5 | 0.12 | 0.02 |
| Dispersant | 2 | 1 | 0.4 | 0.4 |
| Glycerin | 10 | 15 | 20 | 20 |
| Ethylene glycol | — | — | 5 | 5 |
| 2-Pyrrolidone | — | — | 2 | 2 |
| 1,2-Hexanediol | 5 | 5 | 5 | 5 |
| TEGmBE | — | — | — | 5 |
| TEG | — | 2 | 5 | 5 |
| Surfinol E1010 | 0.5 | 1.0 | 0.5 | 0.5 |
| EDTA | 0.02 | 0.02 | 0.02 | 0.02 |
| Emulsion | 4 | 2 | 2 | 5 |
| Pure water | Balance | Balance | Balance | Balance |

TEGmBE: triethylene glycol monobutyl ether
TEG: triethylene glycol
Surfinol E1010: acetylene glycol surfactant manufactured by Air Products and Chemicals, Inc.
EDTA: disodium ethylenediaminetetraacetate
Emulsion: water-soluble styrene-acrylic acid emulsion (non-dispersion)

(3) Preparation of White Ink Composition

White ink compositions having compositions shown in Table 7 were prepared. The hollow white pigment emulsion in Table 7 was prepared according to the method described in JP-A-2006-274214. The unit of the values shown in Table 7 is % by weight as long as not particularly defined.

TABLE 7

| | White | |
|---|---|---|
| Ink composition | 1 | 2 |
| PW6 | 15 | — |
| Hollow white pigment emulsion | — | 15 |
| Dispersant | 5 | — |
| Glycerin | 12 | — |
| Ethylene glycol | — | — |
| 2-Pyrrolidone | — | — |
| 1,2-Hexanediol | 5 | 5 |
| TEGmBE | — | — |
| TEG | — | — |
| Surfinol E1010 | 0.5 | 0.5 |
| EDTA | 0.02 | 0.02 |
| Emulsion | 2 | 2 |
| Pure water | Balance | Balance |

TEGmBE: triethylene glycol monobutyl ether
TEG: triethylene glycol
Surfinol E1010: acetylene glycol surfactant manufactured by Air Products and Chemicals, Inc.
EDTA: disodium ethylenediaminetetraacetate
Emulsion: water-soluble styrene-acrylic acid emulsion (non-dispersion)

3. Ink Set

Ink sets in combinations of ink compositions shown in Table 8 were constituted.

TABLE 8

| | Metallic ink | Chromatic ink | Black ink | White ink |
|---|---|---|---|---|
| Ink set A | 2 | 1, 3, 5, 8 | 1, 2, 3 | 1 |
| Ink set B | 2 | 2, 4, 6, 7 | 1, 2, 3, 4 | 1 |
| Ink set C | 2 | 1, 3, 5, 9 | 1, 2, 3 | 2 |
| Ink set D | 2 | 2, 4, 6, 8, 9 | 2, 3, 4 | 2 |
| Ink set E | 2 | 1, 3, 5, 8 | 1 | 2 |
| Ink set F | 2 | 2, 4, 6, 8, 9 | 2 | 2 |
| Ink set G | 2 | 1, 3, 5 | 1 | 2 |
| Ink set H | 1 | 2, 4, 6, 8, 9 | 2, 3, 4 | 2 |
| Ink set I | 3 | 2, 4, 6, 8, 9 | 2, 3, 4 | 2 |
| Ink set J | 4 | 2, 4, 6, 8, 9 | 2, 3, 4 | 2 |
| Ink set K | 5 | 1, 3, 5, 8 | 1, 2, 3 | 1 |
| Ink set L | 5 | 2, 4, 6, 7 | 1, 2, 3, 4 | 1 |
| Ink set M | 5 | 1, 3, 5, 9 | 1, 2, 3 | 2 |
| Ink set N | 5 | 2, 4, 6, 8, 9 | 2, 3, 4 | 2 |
| Ink set O | 5 | 1, 3, 5, 8 | 1 | 2 |
| Ink set P | 5 | 2, 4, 6, 8, 9 | 2 | 2 |
| Ink set Q | 5 | 1, 3, 5 | 1 | 2 |

4. Evaluation Test (1) Printing Process

Each ink set was evaluated using ink-jet printer PX-G920 (trade name, manufactured by Seiko Epson Corporation), which can simultaneously print only seven colors at most. Accordingly, in an ink set including more than seven ink colors, printing was performed in two times. A mat black ink composition, a black ink composition, a cyan ink composition, a magenta ink composition, a yellow ink composition, a red ink composition, and a blue ink composition were filled in the corresponding color lines of the printer. A metallic ink composition was filled in a gloss optimizer line, and a white ink composition was filled in an arbitrary line of another ink-jet printer. Furthermore, in a case that an orange ink composition was used, the orange ink composition was filled in the magenta line of this another printer. A gray ink composition and a light black ink composition were similarly filled in the mat black line and the black line, respectively, of this another ink-jet printer.

Solid printing at 1440×720 dpi was performed on glossy photo paper having an ink-receiving layer (model number: KA450PSK, manufactured by Seiko Epson Corporation) at room temperature using two ink-jet printers twice in total. In this case, printing was performed using the metallic ink first and then using each ink.

(2) Sensory Evaluation of Printed Material

Glossiness of printed images was sensorily evaluated by visual examination based on the following evaluation criteria:
AA: metallic gloss so shiny as to allow the matter projected on the printed material to be clearly distinguished;
A: metallic gloss so shiny as to allow the matter projected on the printed material to be slightly distinguished;
B: mat metallic gloss; and
C: no metallic gloss obtained.

The results are shown in Table 9.

TABLE 9

| Ink set | Result of visual examination |
|---------|------------------------------|
| A | A |
| B | A |
| C | A |
| D | AA |
| E | A |
| F | A |
| G | A |
| H | A |
| I | B |
| J | AA |
| K | AA |
| L | AA |
| M | AA |
| N | AA |
| O | AA |
| P | AA |
| Q | AA |

As shown in Table 9, recorded articles with images each having high metallic gloss imparted with an arbitrary color tone could be obtained by the above-mentioned ink-jet recording process using the above ink sets.

What is claimed is:

1. An ink set comprising:
an oil ink composition containing a metal pigment; and
at least one aqueous ink composition selected from the group consisting of a chromatic ink composition containing a chromatic pigment, a black ink composition containing a black pigment, and a white ink composition containing a white pigment.

2. The ink set according to claim 1 wherein the metal pigment is plate-like particles having a plane with a major axis X, a minor axis Y, and a thickness Z satisfying conditions that the 50% average particle diameter R50 of circle equivalent diameters calculated from the X-Y plane areas of the plate-like particles is 0.5 to 3 μm, and the R50/Z is larger than 5.

3. The ink set according to claim 1 wherein the metal pigment is made of aluminum or an aluminum alloy.

4. The ink set according to claim 1 wherein the oil ink composition further contains an organic solvent and a resin.

5. The ink set according to claim 1 wherein the concentration of the metal pigment in the oil ink composition is 0.1% to 3.0% by weight.

6. The ink set according to claim 4 wherein the organic solvent contains at least one type of alkylene glycol ether that is a liquid under normal temperature and normal pressure.

7. The ink set according to claim 4 wherein the organic solvent is a mixture of alkylene glycol diether, alkylene glycol monoether, and lactone.

8. The ink set according to claim 4 wherein the resin is at least one selected from the group consisting of polyvinyl butyral, cellulose acetate butyrate, and polyacrylic polyol.

9. The ink set according to claim 1 wherein the chromatic ink composition, the black ink composition, and the white ink composition each contain at least a water-insoluble pigment, water, a water-soluble organic solvent, and a surfactant.

10. The ink set according to claim 9 wherein the water-soluble organic solvent is at least one selected from the group consisting of alkylene glycol, alkylene glycol ether, alkanol, alkane diol, glycerin, polyalkylene glycol, and lactone.

11. The ink set according to claim 9 wherein the surfactant is at least one selected from the group consisting of acetylene diol surfactants, polyether modified silicone surfactants, and polyester modified silicone surfactants.

12. The ink set according to claim 1 wherein
the chromatic ink composition includes a yellow ink composition containing at least one selected from the group consisting of C.I. Pigment Yellow 74, 93, 110, 120, 128, 129, 138, 150, 151, 155, 180, and 213; a magenta ink composition containing C.I. Pigment Red 122 and/or C.I. Pigment Violet 19; and a cyan ink composition containing at least one selected from the group consisting of C.I. Pigment Blue 15:3, 15:4, and 60;
the black ink composition is an ink composition containing C.I. Pigment Black 7; and
the white ink composition is an ink composition containing C.I. Pigment White 6 and/or a hollow white pigment emulsion.

13. The ink set according to claim 12 wherein
the chromatic ink composition further includes at least one composition selected from the group consisting of:
a red ink composition containing C.I. Pigment Red 117;
a green ink composition containing C.I. Pigment Green 7; and
an orange ink composition containing C.I. Pigment Orange 43 and/or 242.

14. The ink set according to claim 12 wherein
the chromatic ink composition further includes at least one selected from the group consisting of:
a light yellow ink composition containing the same type of pigment as that of the yellow ink composition;
a light magenta ink composition containing the same type of pigment as that of the magenta ink composition; and
a light cyan ink composition containing the same type of pigment as that of the cyan ink composition.

15. An ink container containing the ink set according to claim 1.

16. A liquid ejecting apparatus provided with the ink container according to claim 15.

17. An ink-jet recording process utilizing the ink set according to claim 1 for recording an image by ejecting a droplet of an ink composition and depositing the droplet onto a recording medium.

18. The ink-jet recording process according to claim 17 wherein the image is formed by simultaneously ejecting the oil ink composition; and at least one selected from the group consisting of the chromatic ink composition, the black ink composition, and the white ink composition.

19. The ink-jet recording process according to claim 17 wherein an image is formed by utilizing the oil ink composition and then an arbitrary color tone is formed by utilizing the chromatic ink composition.

20. The ink-jet recording process according to claim 17 wherein printing is conducted under heating of the recording medium.

21. The ink-jet recording process according to claim 20 wherein the heating is conducted before the printing and/or simultaneously with the printing and/or after the printing.

22. A recorded article recorded by the ink-jet recording process according to claim 17.

* * * * *